United States Patent
Cha et al.

(10) Patent No.: US 11,657,439 B2
(45) Date of Patent: May 23, 2023

(54) SYSTEM AND METHOD FOR PROVIDING VEHICLE PART CHANGE SERVICE

(71) Applicants: HYUNDAI MOTOR COMPANY, Seoul (KR); KIA MOTORS CORPORATION, Seoul (KR)

(72) Inventors: Dong Eun Cha, Hwaseong-si (KR); Jin Ho Hwang, Seoul (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/905,994

(22) Filed: Jun. 19, 2020

(65) Prior Publication Data
US 2021/0019714 A1    Jan. 21, 2021

(30) Foreign Application Priority Data
Jul. 15, 2019    (KR) .......................... 10-2019-0084997

(51) Int. Cl.
G06Q 30/0601     (2023.01)
G06Q 10/20       (2023.01)
(Continued)

(52) U.S. Cl.
CPC ......... *G06Q 30/0621* (2013.01); *G06Q 10/20* (2013.01); *G06Q 30/0278* (2013.01);
(Continued)

(58) Field of Classification Search
CPC .... G06Q 10/20; G06Q 40/08; G06Q 30/0283; G06Q 30/0627; G06Q 30/0278; G06Q 30/0621; G07C 5/0841
See application file for complete search history.

(56) References Cited

U.S. PATENT DOCUMENTS 4,765,649 A * 8/1988 Ikemoto ............. B60G 17/0162
                                                      280/5.506
5,839,112 A    11/1998 Schreitmueller et al.
(Continued)

FOREIGN PATENT DOCUMENTS

CN    104217578 A * 12/2014
CN    105630537 A *  6/2016 ............... G06F 8/65
(Continued)

OTHER PUBLICATIONS

Interactive Garage, Archive Date of Apr. 26, 2017, https://web.archive.org/web/20170426091311/https://www.interactivegarage.com/ (Year: 2017).*

(Continued)

*Primary Examiner* — Gerardo Araque, Jr.
(74) *Attorney, Agent, or Firm* — Morgan, Lewis & Bockius LLP

(57) ABSTRACT

A system for providing a vehicle part change service is provided, may include a server provided with part information related to changeable parts for a plurality of vehicle kinds, the server providing kinds of the changeable parts to a user terminal if a part change request for a specific vehicle kind is received from the user terminal, guiding a cost for a change target part through the user terminal if the corresponding part is selected through the user terminal and processing to transport the changed part to a service center, and outputting at least one of vehicle specification information or vehicle control data being changed due to the change of the part.

9 Claims, 10 Drawing Sheets

(51) Int. Cl.
*G06Q 30/02* (2023.01)
*G06Q 30/0283* (2023.01)
*G06Q 40/08* (2012.01)
*G07C 5/08* (2006.01)

(52) U.S. Cl.
CPC ..... *G06Q 30/0283* (2013.01); *G06Q 30/0627* (2013.01); *G06Q 40/08* (2013.01); *G07C 5/0841* (2013.01)

(56) References Cited

U.S. PATENT DOCUMENTS

| | | | | |
|---|---|---|---|---|
| 5,899,952 | A * | 5/1999 | Fukada | B60W 40/103 303/146 |
| 9,208,526 | B1 | 12/2015 | Leise | |
| 9,886,841 | B1 * | 2/2018 | Nave | B60W 10/04 |
| 10,121,037 | B1 * | 11/2018 | Bondarenko | G06K 7/10722 |
| 10,586,404 | B1 * | 3/2020 | Nguyen | G07C 5/0808 |
| 2007/0298866 | A1 * | 12/2007 | Gaudiano | A63F 13/00 463/23 |
| 2008/0201240 | A1 * | 8/2008 | Borden | G06Q 30/02 705/27.2 |
| 2014/0350749 | A1 * | 11/2014 | Kwak | B60R 16/0231 701/2 |
| 2015/0057875 | A1 * | 2/2015 | McGinnis | G07C 5/0841 701/31.6 |
| 2015/0348058 | A1 * | 12/2015 | Liu | G06Q 30/0201 705/14.49 |
| 2016/0110935 | A1 * | 4/2016 | Kwak | G07C 5/008 701/123 |
| 2016/0305850 | A1 * | 10/2016 | Park | G01M 17/007 |
| 2016/0371759 | A1 * | 12/2016 | Wilson | G06Q 30/0627 |
| 2017/0098272 | A1 * | 4/2017 | Brockman | G06F 3/0482 |
| 2017/0129480 | A1 * | 5/2017 | Sunahara | B60W 30/18145 |
| 2018/0053354 | A1 * | 2/2018 | Jenkins | H04L 67/12 |
| 2018/0336026 | A1 * | 11/2018 | Park | G06F 8/65 |
| 2018/0351557 | A1 | 12/2018 | Jim et al. | |
| 2019/0234336 | A1 * | 8/2019 | Kim | G07C 5/0808 |

FOREIGN PATENT DOCUMENTS

| | | | | |
|---|---|---|---|---|
| CN | 106657204 | A * | 5/2017 | ............... G06F 8/65 |
| DE | 10344911 | A1 * | 4/2004 | .......... B60T 8/17616 |
| JP | 2005-050022 | A | 2/2005 | |
| KR | 10-2002-0000937 | A | 1/2002 | |
| KR | 10-1661102 | B1 | 9/2016 | |
| KR | 10-1779509 | B1 | 10/2017 | |
| KR | 10-2017-0140654 | A | 12/2017 | |
| KR | 10-1966220 | B1 | 4/2019 | |
| KR | 101966229 | B1 | 4/2019 | |
| WO | WO-2008079669 | A2 * | 7/2008 | ............. G06Q 30/02 |
| WO | WO-2011057359 | A1 * | 5/2011 | .......... G01M 15/102 |
| WO | WO-2018028799 | A1 * | 2/2018 | ............... G06N 5/02 |
| WO | WO-2018028834 | A1 * | 2/2018 | ............... G06N 5/02 |

OTHER PUBLICATIONS

Jason Unrau, "How to Choose a Body Kit" Apr. 8, 2016, https://www.yourmechanic.com/article/how-to-buy-a-body-kit-by-jason-unrau (Year: 2016).*
Philippe Govaerts, "The Importance of Lightweight Wheels Explained", RallyWays, Jan. 30, 2016, https://web.archive.org/web/20160130090938/https://rallyways.com/10869/lightweight-wheels/ (Year: 2016).*
Classic Industries News "How Do Lightweight Wheels Affect Your Car's Performance" Sep. 5, 2014, https://news.classicindustries.com/restoration-tips/wheel-weight-matters-unsprung/ (Year: 2014).*
Tony Quiroga "Effects of Upsized Wheels and Tires Tested," Apr. 9, 2010, CarandDriver, https://www.caranddriver.com/features/a15130598/upsized-wheels-tires/ (Year: 2010).*
A. Markel, "2005-2011 Cadillac STS," Brake & Front End, vol. 84, (9), pp. 26(2), Sep. 2012 (Year: 2012).*
Anonymous "How to Reset Steering Angle Sensor?" Jul. 20, 2017, Auto Knowledge, Auto Repair, Do It Yourself https://www.car-auto-repair.com/how-to-reset-steering-angle-sensor/ (Year: 2017).*
Larry Carley, "Diagnosing Wheel Speed Sensors: WSS, ABS Systems" Oct. 1, 2008, https://www.brakeandfrontend.com/diagnosing-wheel-speed-sensors/ (Year: 2008).*
Mark Hales (Car weight distribution: understanding its effects when driving on track Aug. 8, 2017 https://www.evo.co.uk/advice/9841/car-weight-distribution-understanding-its-effects-when-driving-on-track (Year: 2017).*
NASIOC Forum, "Resetting Steering Angle Sensor in 2009 WRX," May 2, 2016 https://forums.nasioc.com/forums/showthread.php?t=2787190 (Year: 2016).*
Nils Larsen "Real-Time Calibration of the Steering Wheel Angle Sensor" Master of Science Thesis in Electrical Engineering Department of Electrical Engineering Linkoping University Division of Vehicular Systems 2017 (Year: 2017).*
Extended European Search Report dated Oct. 29, 2020 issued in European Patent Application No. 20181167.6.
Korean Office Action dated Jun. 21, 2021 issued in Korean Patent Application No. 10-2019-0084997.

* cited by examiner

Av. Weight : 900 → 950
Av. Power : 55 → 57

SYSTEM AND METHOD FOR PROVIDING VEHICLE PART CHANGE SERVICE

CROSS REFERENCE TO RELATED APPLICATION

The present application claims priority to Korean Patent Application No. 10-2019-0084997 filed on Jul. 15, 2019, the entire contents of which is incorporated herein for all purposes by this reference.

BACKGROUND OF THE INVENTION

Field of the Invention

The present invention relates to a system and a method for providing a vehicle part change service, which provides a service for changing parts constituting a vehicle.

Description of Related Art

Recently, the number of drivers who change vehicle parts in accordance with personal tastes and surrounding situations has been increased. For example, if a vehicle currently has an insufficient loading space, a driver may increase the loading space by changing a trunk part, and for personal convenience, the driver may change a body type trunk to a clam-shell type trunk. However, generally, a system or a service does not exist, which can integrally provide information about new parts against old parts to be changed, selection of a service center to provide a part change service, vehicle specification information to be changed due to the vehicle part change, and information on control data of a control device, and this may cause a big inconvenience to the drivers.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method for providing a vehicle part change service configured for increasing driver's convenience through integral providing of information related to new parts against old parts to be changed, vehicle specification information to be changed due to the vehicle part change, and information on control data of a control device.

In one aspect of the present invention to achieve the above object, a system for providing a vehicle part change service includes a server provided with part information related to changeable parts for a plurality of vehicle kinds, the server providing kinds of the changeable parts to a user terminal if a part change request for a specific vehicle kind is received from the user terminal, guiding a cost for a change target part through the user terminal if the corresponding part is selected through the user terminal and processing to transport the changed part to a service center, and outputting at least one of vehicle specification information or vehicle control data being changed due to the change of the part.

The server may include at least one of a database configured to store therein vehicle information related to the plurality of vehicle kinds, change target part information for each vehicle, part information to be changed, and the vehicle control data to be changed in accordance with the changed target part; a service center recommendation unit configured to recommend the service center providing the vehicle part change service based on user information input from the user terminal; a part transport processing unit configured to process the corresponding part input from the user terminal to be transported to the service center; and a payment unit configured to pay the cost for the change service of the part input from the user terminal.

The server may further include a residual value calculation unit configured to determine a residual value of a vehicle.

The server may further include a change information providing unit configured to output and provide the vehicle specification information being changed in accordance with the change of the change target part to a new part, to the user terminal or a display unit of a vehicle.

The server may further include a control data providing unit configured to determine a vehicle performance variation being changed in accordance with the change of the change target part and to provide new control data to a plurality of control devices of which control data may be changed based on the determined vehicle performance variation.

The server may further include a used article price calculation unit configured to determine a used article price of the change target part.

The vehicle information may include at least one of vehicle kind, trim, color, weight, and model year information, and the part information may include at least one of kind, color, weight, size, and structure information related to a vehicle body part and a chassis part.

The plurality of control devices may include at least one of an engine controller, a transmission controller, a brake controller, an airbag controller, a steering controller, an autonomous driving controller, and a lamp controller.

The residual value calculation unit may be configured to determine the residual value of the vehicle based on one or more of vehicle trim, driving distance, model year, usable residual time period, external appearance state, accident history, and changed part value information in the vehicle.

The system may further include an insurance company server configured to determine and transfer a premium of the vehicle to the user terminal, wherein the server is configured to transfer, to the insurance company server, residual value information related to the vehicle which is changed by the residual value calculation unit in accordance with the change of the change target part in the vehicle to the corresponding part, and the insurance company server recalculates the premium of the vehicle based on the changed residual value of the vehicle and transfers the recalculated premium to the user terminal.

The payment unit may compute an amount of money required for the vehicle part change service based on one or more pieces of information related to a price of a new part, a used article price of the change target part, and a part transport distance to the service center, and may guide the determined amount of money through the user terminal.

The change information providing unit may be configured to provide the user terminal or the display unit of the vehicle with one or more of vehicle weight, power, color, storage space, trunk kind, and wheel weight distribution change information in the vehicle being changed in accordance with the change of the change target part in the vehicle to the corresponding part of the vehicle.

The vehicle control data providing unit may be configured to determine a vehicle fuel economy, a chassis durability, a braking distance, an acceleration performance, and a steering performance variation in the vehicle being changed due to the changed corresponding part, and to provide new control data to the plurality of control devices of which the vehicle control data may be changed based on the determined vehicle performance variation.

The server may further include an after-sales service prediction unit configured to provide a prediction time required for after-sales service with respect to the changed corresponding part.

The server may further include a storage configured to store the changeable parts, wherein in case that a part change order for a specific vehicle kind is received from the user terminal, the server may be configured to select an ordered part in the storage, to perform painting in case that the ordered part has not been painted, and to transport the ordered part to the service center after completion of packing of the ordered part.

In another aspect of the present invention to achieve the above object, a method for providing a vehicle part change service using a system for providing a vehicle part change service includes receiving, by a server, a part change request for a specific vehicle kind from a user terminal; providing, by the server, the kinds of the changeable parts to the user terminal; guiding, by the server, the cost for the change target part through the user terminal if the corresponding part is selected through the user terminal and processing to transport the changed part to a service center; and outputting, by the server, at least one of vehicle specification information or vehicle control data being changed due to the change of the part.

The method may further include at least one of recommending the service center that provides the vehicle part change service based on user information input from the user terminal; selecting, by the user terminal, the vehicle part change service; determining a residual value of a vehicle; and determining a used article price of the change target part.

The outputting, by the server, the vehicle control data being changed due to the change of the part may determine a fuel economy, a chassis durability, a braking distance, an acceleration performance, and a steering performance variation in the vehicle being changed in accordance with the change of the change target part in the vehicle to the corresponding part, and may provide new control data to a plurality of control devices of which the vehicle control data may be changed based on the determined vehicle performance variation.

The method may further include recalculating the residual value of the vehicle which is changed in accordance with a change of a vehicle body part after the determining the residual value of the vehicle; transferring recalculated residual value information related to the vehicle to an insurance company server; and recalculating, by the insurance company server, a premium of the vehicle based on the recalculated residual value information related to the vehicle and transferring the recalculated premium to the user terminal.

The guiding, by the server, the cost for the change target part through the user terminal if the corresponding part is selected through the user terminal may compute an amount of money required for the vehicle part change service based on a price of a new part, a used article price of the change target part, and a part transport distance to the service center, and may guide the determined amount of money through the user terminal.

The outputting, by the server, the vehicle specification information being changed due to the change of the part may provide the user terminal with one or more of vehicle weight, power, color, storage space, trunk kind, and wheel weight distribution change information in the vehicle being changed in accordance with the change of the change target part in the vehicle to the corresponding part.

The method may further include providing a prediction time required for an after-sales service with respect to the changed part.

According to an exemplary embodiment of the present invention, the driver's convenience may be improved by integrally providing the information related to the new part to be changed, the vehicle specification information to be changed due to the vehicle part change, and the information on the vehicle control data of the control device.

Furthermore, an economic gain may be provided to the user by recalculating the residual value of the vehicle which is changed in accordance with the change to the new part, transferring the determined residual value of the vehicle to the insurance company server, and recalculating, by the insurance company server, the premium based on the changed residual value of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
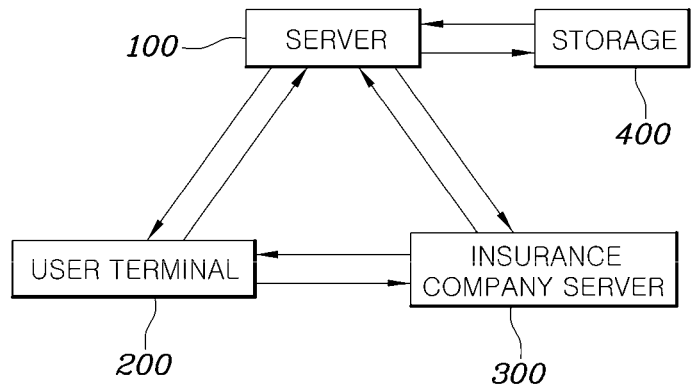
FIG. 1 is a diagram illustrating the configuration of a system for providing a vehicle part change service according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DESCRIPTION OF EXEMPLARY EMBODIMENT

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the present invention will be described in detail with reference to the drawings. The terms or words used in the description and claims may not be construed as limited to typical or dictionary meanings, and they may be construed as meanings and concepts that suit the technical idea of the present invention on the basis of the principle that inventor(s) can properly define the concepts of the terms to explain his or her invention in the best way.

Accordingly, because an exemplary embodiment described in the description and a configuration described in the drawings are merely the most preferable embodiment of the present invention, but do not speak for all the technical idea of the present invention, it may be understood that there may be various equivalents and modifications configured for replacing them at the time of the present application.

Figure 2:
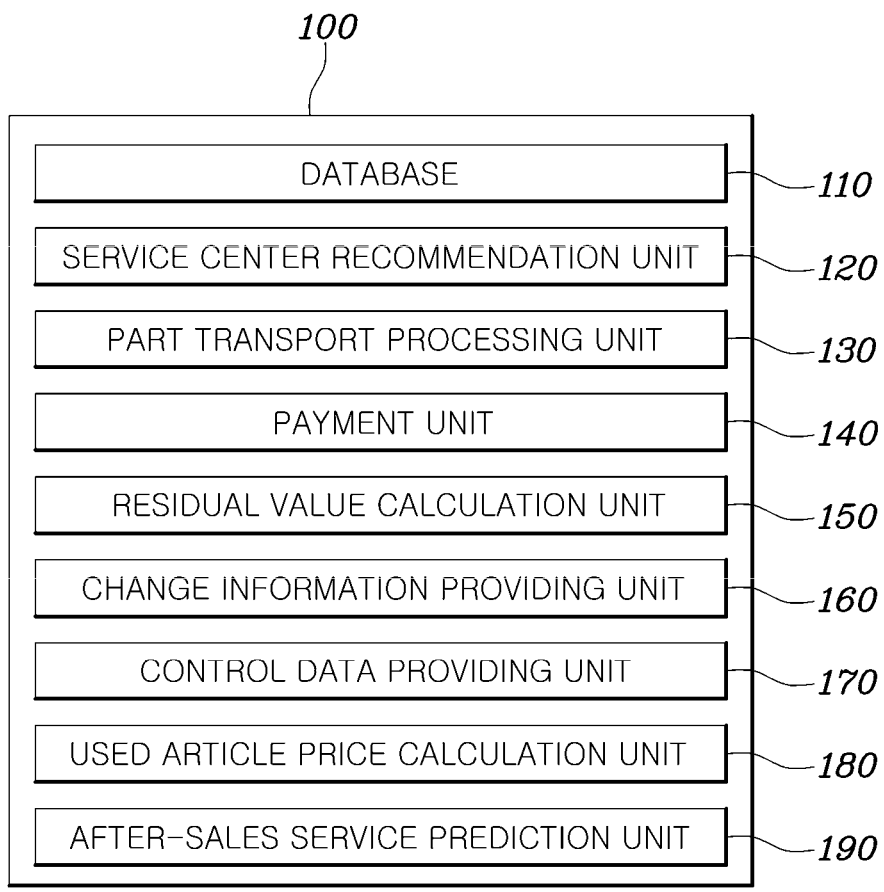
FIG. 2 is a diagram illustrating the detailed configuration of a server in a system for providing a vehicle part change service according to an exemplary embodiment of the present invention.
Figure 3:
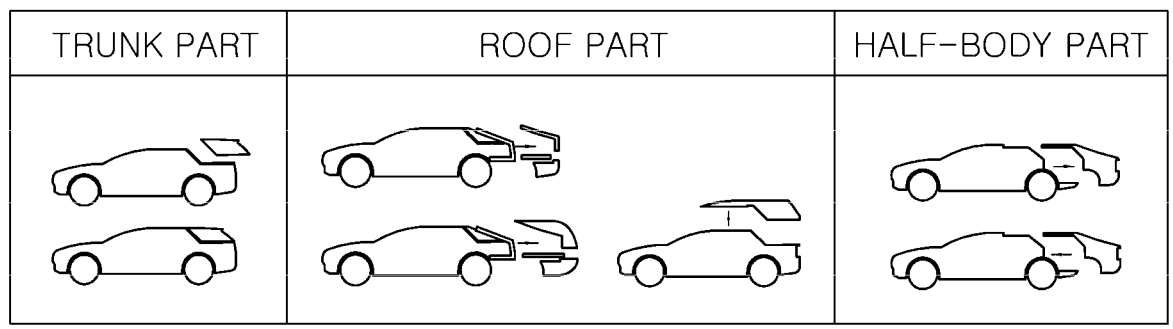
FIG. 3 is a diagram illustrating that part information is divided in accordance with a vehicle kind and a part kind in a database of a system for providing a vehicle part change service according to an exemplary embodiment of the present invention.
Figure 4:
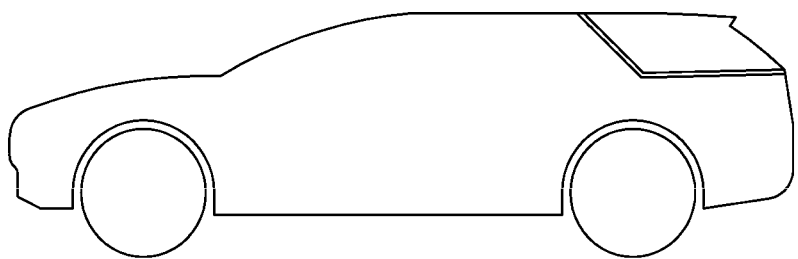
FIG. 4 is a diagram illustrating that a weight and a power of a vehicle are changed in accordance with a change of a part in a system for providing a vehicle part change service according to an exemplary embodiment of the present invention.
Figure 5:
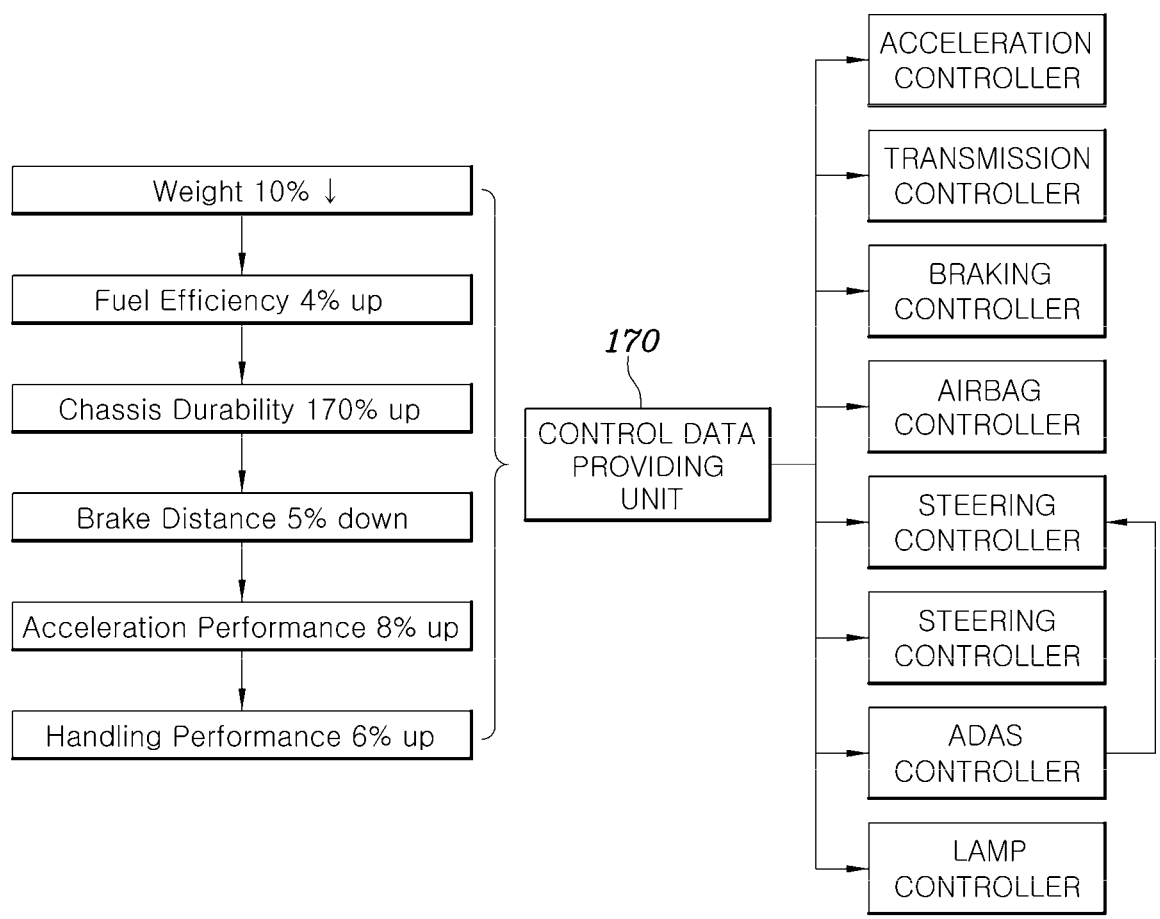
FIG. 5 is a diagram explaining that new control data is provided to a plurality of control devices of which control data may be changed in accordance with a performance variation determined based on a vehicle performance being changed in accordance with parts in a system for providing a vehicle part change service according to an exemplary embodiment of the present invention.
Figure 6:
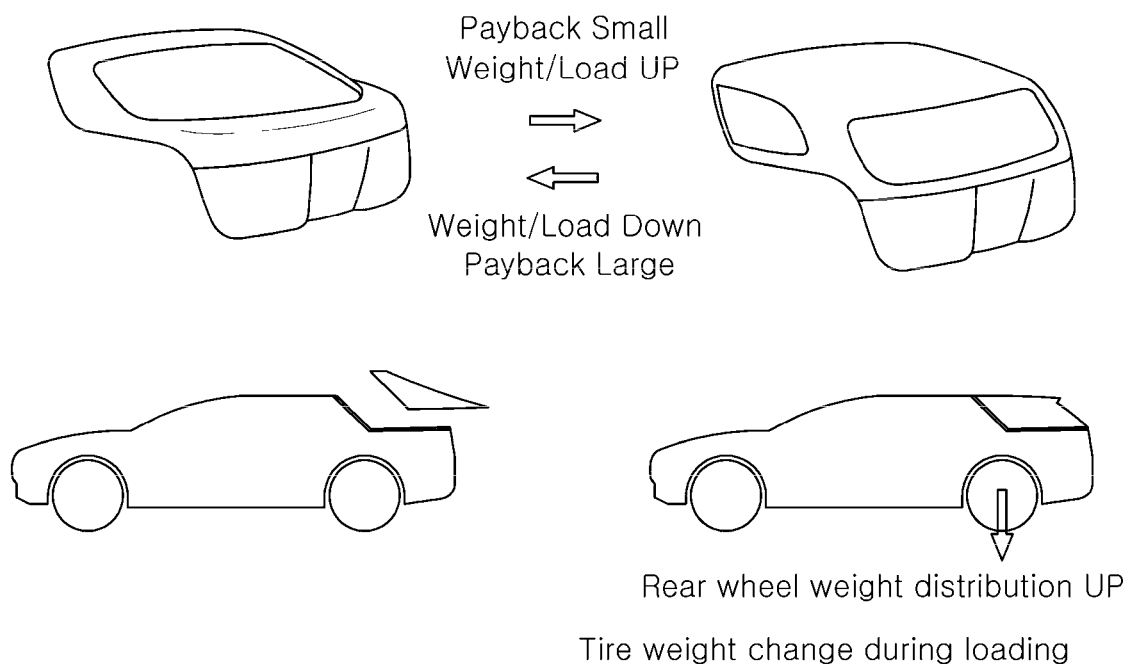
FIG. 6 is a diagram explaining that a weight distribution of a rear wheel is changed in accordance with a part change in a system for providing a vehicle part change service according to an exemplary embodiment of the present invention.
Figure 7:
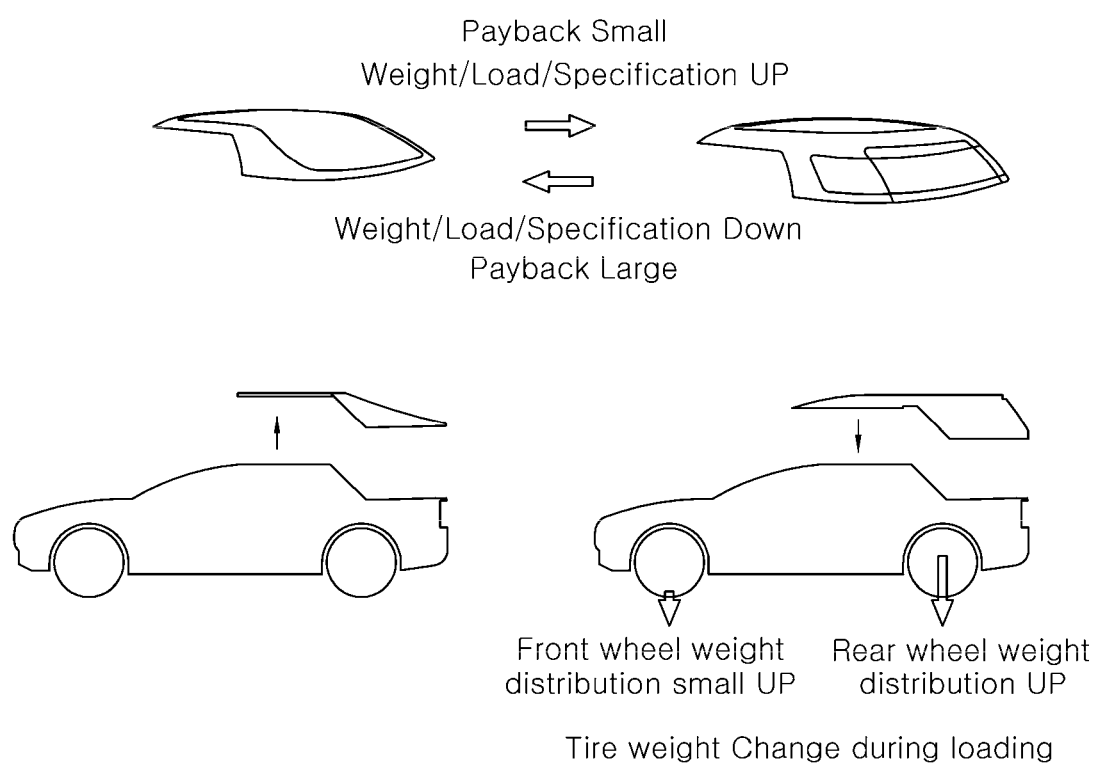
FIG. 7 is a diagram explaining that weight distributions of a front wheel and a rear wheel are changed in accordance with a part change in a system for providing a vehicle part change service according to an exemplary embodiment of the present invention.
Figure 8:
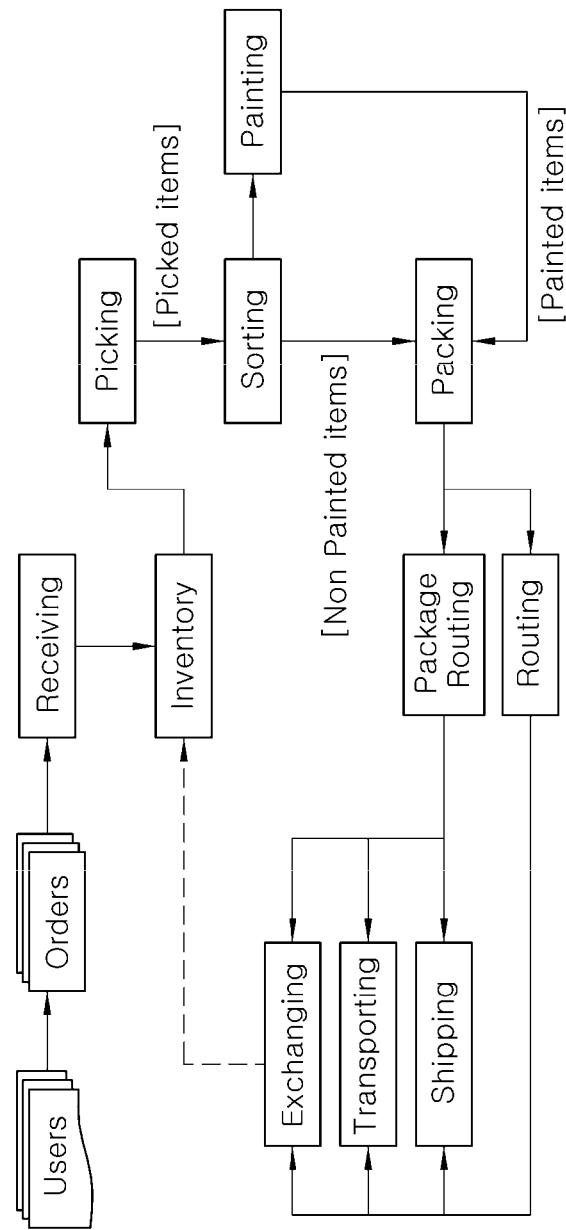
FIG. 8 is a diagram explaining a process of transporting an ordered part after a part order in a system for providing a vehicle part change service according to an exemplary embodiment of the present invention.
Figure 9:
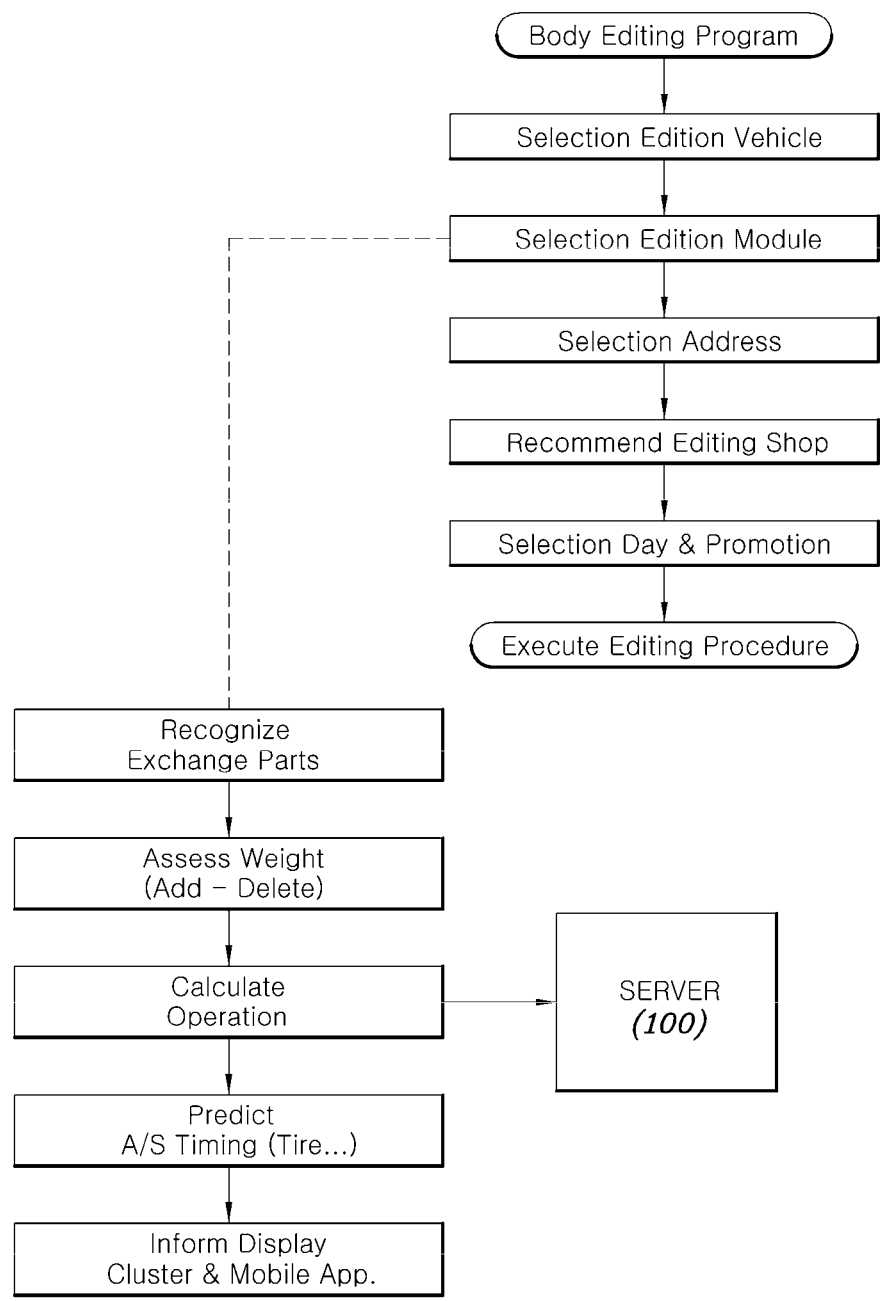
FIG. 9 is a diagram explaining an operation of a system for providing a vehicle part change service according to an exemplary embodiment of the present invention.
Figure 10:
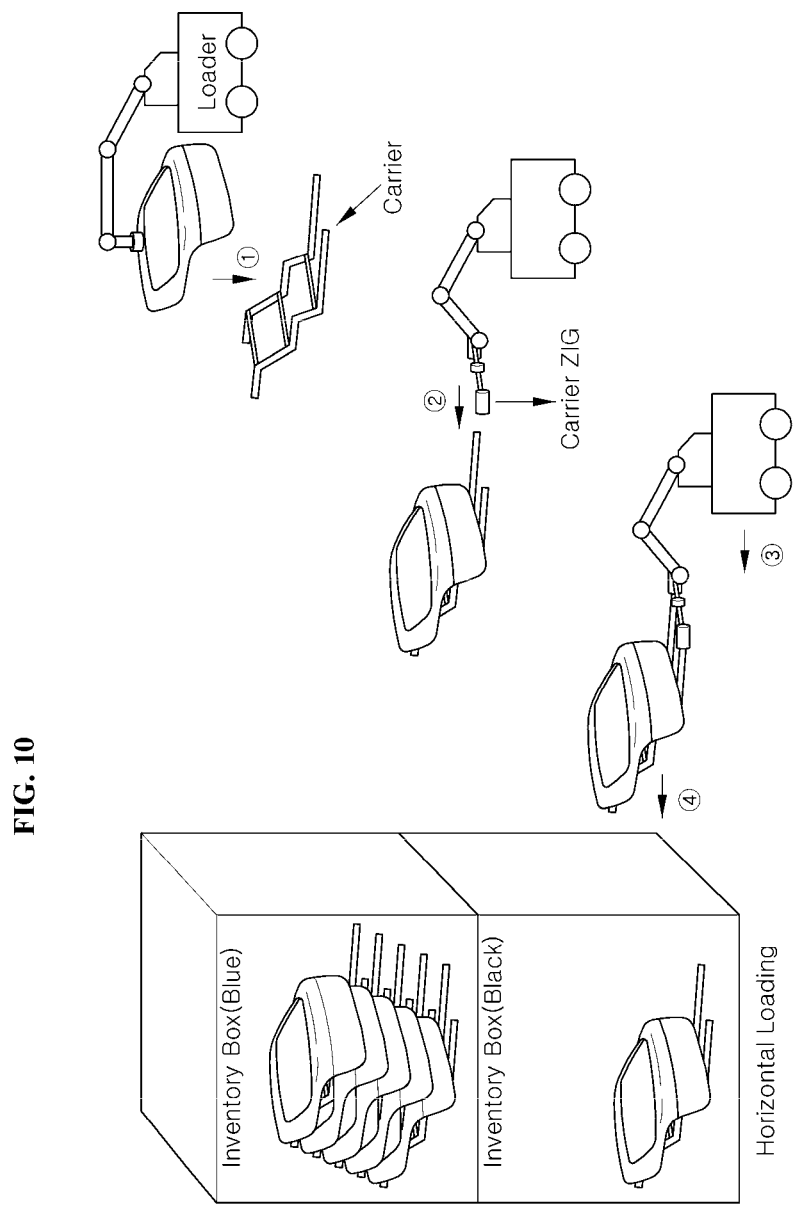
FIG. 10, and FIG. 11 are diagrams explaining how parts are stored in a storage of a system for providing a vehicle part change service according to an exemplary embodiment of the present invention.
Figure 11:
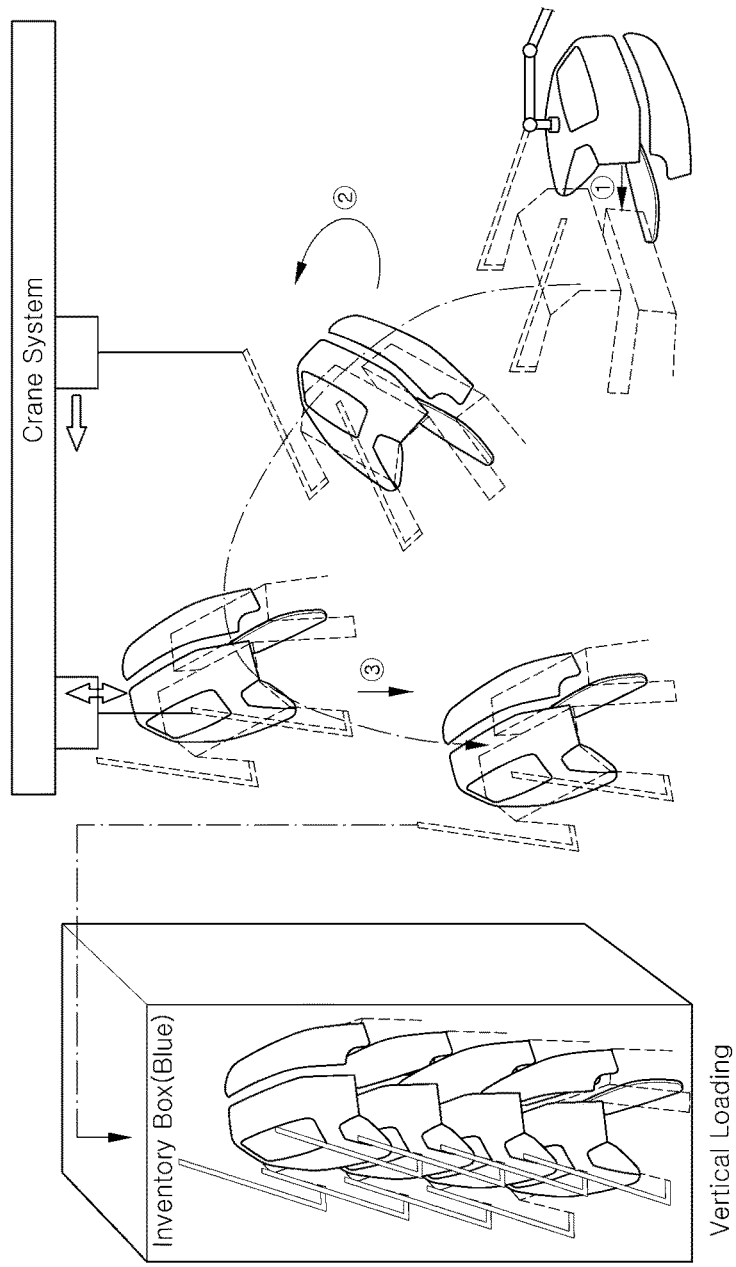

FIG. 1 is a diagram illustrating the configuration of a system for providing a vehicle part change service according to an exemplary embodiment of the present invention, and FIG. 2 is a diagram illustrating the detailed configuration of a server in a system for providing a vehicle part change service according to an exemplary embodiment of the present invention. FIG. 3 is a diagram illustrating that vehicle part information is divided in accordance with a vehicle kind and a part kind in a database, and FIG. 4 is a diagram illustrating that a weight and a power of a vehicle are changed in accordance with a change of a part. FIG. 5 is a diagram explaining that new control data is provided to a plurality of control devices of which control data may be changed in accordance with a performance variation determined based on a vehicle performance being changed in accordance with parts, and FIG. 6 is a diagram explaining that a weight distribution of a rear wheel is changed in accordance with a part change. FIG. 7 is a diagram explaining that weight distributions of a front wheel and a rear wheel are changed in accordance with a part change, and FIG. 8 is a diagram explaining a process of transporting an ordered part after ordering of a part. FIG. 9 is a diagram explaining an operation of a system for providing a vehicle part change service according to an exemplary embodiment of the present invention, and FIG. 10, and FIG. 11 are diagrams explaining how parts are stored in a storage of a system for providing a vehicle part change service according to an exemplary embodiment of the present invention.

With reference to FIG. 1, a system for providing a vehicle part change service according to an exemplary embodiment of the present invention may include a server 100 and a user terminal 200, and may further include an insurance company server 300. Furthermore, the system may further include a storage 400 for storing changeable parts. According to an exemplary embodiment of the present invention, the user terminal 200 may be a cellular phone, a tablet PC, a desktop computer, or a notebook computer. However, this is merely exemplary, and other various devices that are connected to the server 100 and the insurance company server 300 to transmit and receive data may be used as the user terminal 200 in an exemplary embodiment of the present invention.

The server 100 may be provided with part information related to changeable parts for respective vehicle kinds, and if a part change request for a specific vehicle kind is received from the user terminal 200, the server 100 may provide kinds of the changeable parts to the user terminal 200. Furthermore, if a change target part is selected through the user terminal 200, the server 100 may guide a cost required for the corresponding change target part through the user terminal 200, process to transport the changed part to a service center, and output at least one of vehicle specification information or vehicle control data being changed due to the change of the part.

Furthermore, if a part change order for a specific vehicle kind is received from the user terminal 200, the server 100 may be configured to select an ordered part in the storage 400, to perform painting in case that the ordered part has not been painted, and to transport the ordered part to the service center after completion of packing of the ordered part.

Hereinafter, with reference to the drawings, the detailed configuration of the system for providing the vehicle part change service according to an exemplary embodiment of the present invention will be described in more detail.

With reference to FIG. 2, the server 100 may include at least one of a database 110, a service center recommendation unit 120, a part transport processing unit 130, and a payment unit 140. Furthermore, according to embodiments, the server may further include at least one of a residual value calculation unit 150, a change information providing unit 160, a control data providing unit 170, a used article price calculation unit 180, and an after-sales service prediction unit 190.

In the database 110, vehicle information related to a plurality of vehicle kinds, change target part information for each vehicle, part information to be changed, and vehicle control data to be changed in accordance with the changed part may be stored. Here, the vehicle information may include at least one of vehicle kind, trim, color, weight, and model year information. Furthermore, the part information may include at least one of kind, color, weight, size, and structure information related to a vehicle body part and a chassis part.

According to an exemplary embodiment of the present invention, the database 110 may store respective part information by classifying the changeable parts for respective vehicle kinds based on the part kind, part structure, and part color. With reference to FIG. 3, the changeable parts may be divided into a trunk part, a roof part, and a vehicle body half part, and detailed information related to the respective parts may be stored in the database 110. In the instant case, the trunk part is further divided into a trunk part of a sedan vehicle and a trunk part of a wagon vehicle for each vehicle kind as illustrated in FIG. 3, and it may be further divided and stored in accordance with a trunk opening structure.

The service center recommendation unit 120 may recommend a service center providing the vehicle part change service based on user information input from the user terminal 200. Here, the user information may include at least one of user's name, address, contact, and e-mail information. In other words, the service center recommendation unit 120 may generate a recommendation list of service centers located adjacent to the user based on the user information input from the user terminal 200, and may provide the generated service center recommendation list to the user terminal 200. The user terminal 200 may select the vehicle part change service center by selecting a specific service center from the service center recommendation list.

Furthermore, if the service center is selected by the user terminal 200, the server may guide a part change serviceable date through the user terminal 200, and may process to provide a part change providing service at the corresponding date through reception of an input of a part change reservation date from the user terminal 200.

The part transport processing unit 130 may process to transport the part input from the user terminal 200 to the service center. In other words, if the service center for providing the vehicle part change service is elected by the user terminal 200, the part transport processing unit 130 may process to transport the corresponding part input from the user terminal 200 to the selected service center.

Meanwhile, according to an exemplary embodiment of the present invention, parts of a specific vehicle kind may be horizontally loaded and stored in the storage 400 as shown in FIG. 10, and according to another exemplary embodiment of the present invention, parts of a specific vehicle kind may be vertically loaded in the storage 400 as shown in FIG. 11. According to exemplary embodiments, as illustrated in FIG. 10, and FIG. 11, in the storage 400, a device, such as a robot or a crane, for loading vehicle parts in a storage box or unloading the loaded parts, and a painting device for painting the parts may be provided.

With reference to FIG. 8, a process of transporting ordered parts to a service center will be described. If a part change order for a specific vehicle kind is received from the user terminal 200, the part transport processing unit 130 may process to select the ordered part in the storage 400 through a robot or the like, and to immediately proceed with packing if painting of the corresponding part has been completed, whereas to complete the painting by the painting device and to perform the packing through the robot or the like if the painting of the corresponding part has not been completed. The part transport processing unit 130 may transport the packed part to the service center.

The payment unit 140 may pay the cost required for the change service of the part input from the user terminal 200. The payment unit 140 may compute an amount of money required for the vehicle part change service based on one or more of a price of a new part, a used article price of a change target part, and a part transport distance to the service center, and may guide the determined amount of money through the user terminal 200 to pay the corresponding cost.

According to embodiments, in the case of changing a specific part to a new part due to an accident or the like, the payment unit 140 may guide the price of the new part for the change through the user terminal 200 and may pay the corresponding amount of money. According to another exemplary embodiment of the present invention, in the case of returning the change target part and replacing by the new part, the payment unit 140 may guide an amount of money obtained by excluding the used article price of the change target part determined by the used article price calculation unit 180 to be described later from the new part price through the user terminal 200 and may process to pay the corresponding amount of money.

In addition to the part price, the payment unit 140 may additionally impose a transport fare to the user in consideration of the part transport distance from the user terminal 200 to the selected service center. According to an exemplary embodiment of the present invention, if the part transport distance to the service center is within a predetermined range, a basic transport fare may be imposed, whereas if the part transport distance to the service center is out of the predetermined range, an additional transport fare may be imposed.

The residual value calculation unit 150 is configured to determine a residual value of a vehicle. The residual value calculation unit 150 may determine the residual value of the vehicle based on one or more of vehicle trim, driving distance, model year, usable residual time period, external appearance state, accident history, and changed part value information in the vehicle. For example, if the vehicle residual value determined based on the corresponding vehicle trim, driving distance, model year, usable residual time period, external appearance state, accident history, and changed part value information is 20,000,000 won, the used article price of the change target part is 1,000,000 won, and the price of the new part is 3,000,000 won, the residual value calculation unit 150 may determine the vehicle residual value as 22,000,000 won (=20,000,000 won−1,000,000 won+3,000,000 won).

On the other hand, the system for providing the vehicle part change service according to an exemplary embodiment of the present invention may further include the insurance company server 300 configured to determine and transfer the premium of the vehicle to the user terminal 200. The server 100 transfers, to the insurance company server 300, residual value information related to the vehicle which is changed by the residual value calculation unit 150 in accordance with the change of the part, and the insurance company server 300 recalculates the premium of the vehicle based on the changed residual value of the vehicle and transfers the recalculated premium to the user terminal 200.

The change information providing unit 160 may provide the user terminal 200 or the display unit of the vehicle with one or more of vehicle weight, power, color, storage space, trunk kind, and wheel weight distribution change information in the vehicle being changed in accordance with the change of the part of the vehicle. Here, according to embodiments, the display unit of the vehicle may be a cluster, a head-up display, or an audio video navigation (AVN).

The vehicle weight, power, color, storage space, and trunk kind information related to the change target part and the new part may be pre-stored in the database 110, and if the information on the change target part and the new part is input from the user terminal 200, the change information providing unit 160 may provide the changed information related to the vehicle weight, power, color, storage space, and trunk kind being changed in accordance with the change of the change target part to the new part to one or more of the user terminal 200 and the display unit of the vehicle.

The change information providing unit 160 may provide the changed vehicle weight and power information, as compared with the previous one before the change in accordance with the change of the trunk part of the vehicle to one or more of the user terminal 200 and the display unit of the vehicle as shown in FIG. 7.

Furthermore, the change information providing unit 160 may provide the change of the weight distribution and the storage space of the front and rear wheels, as compared with the previous one before the change in accordance with the change of the trunk part of the vehicle to one or more of the user terminal 200 and the display unit of the vehicle as shown in FIG. 6 and FIG. 7.

Figure 12:
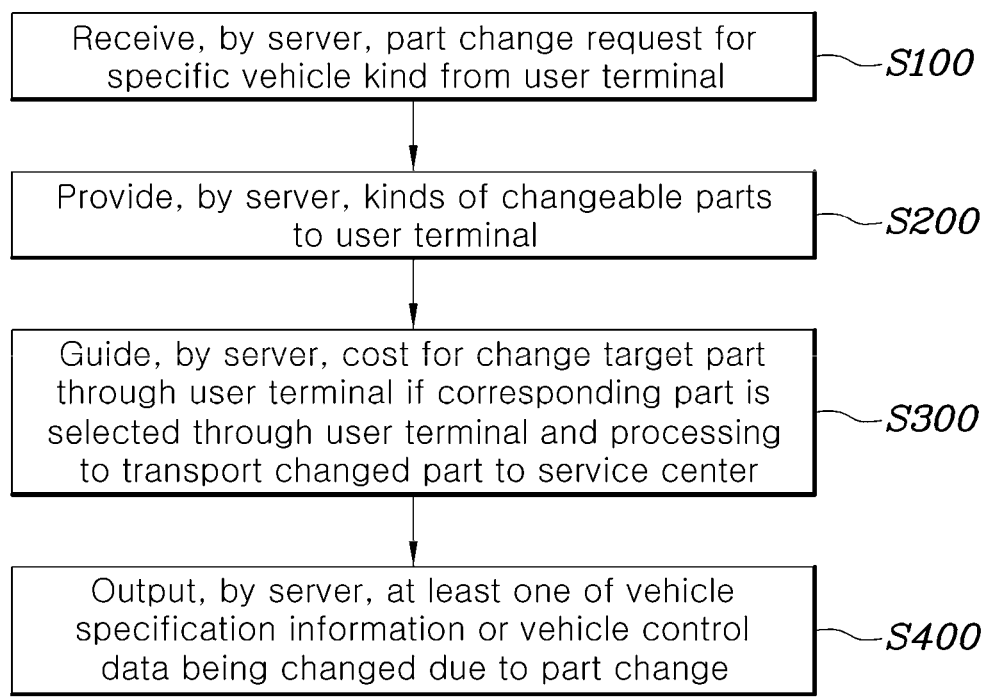
FIG. 12 is a diagram illustrating a flow of a method for providing a vehicle part change service according to an exemplary embodiment of the present invention.

Furthermore, the change information providing unit 160 may provide the vehicle specification information being changed in accordance with the change of the part of the vehicle to one or more of the user terminal 200 and the display unit of the vehicle as shown in FIG. 12.

The vehicle control data providing unit 170 may determine a vehicle performance variation being changed in accordance with the change of the part and may provide new control data to a plurality of control devices of which control data may be changed based on the determined vehicle performance variation. Here, the plurality of control devices mounted on the vehicle may include at least one of an engine controller configured for controlling an engine output increase and output weakening, a transmission controller configured for controlling the transmission timing according to a weight variation of the vehicle, a brake controller configured for controlling reduction of a braking distance, an airbag controller configured for controlling a detecting sensitivity of an impact amount according to the weight variation of the vehicle, a steering controller detecting changes of forward and rear wheels of the vehicle and a shaft load and controlling a steering angle, an autonomous driving controller updating side and rear collision warning devices and performing integrated control against side and rear collision warnings, and a lamp controller changing or upgrading head lamp leveling and rear lamp control distribution.

The vehicle control data providing unit 170 may determine a vehicle fuel economy, a chassis durability, a braking distance, an acceleration performance, and a steering performance variation in the vehicle being changed due to the changed corresponding part, and may provide new control data to the plurality of control devices of which the vehicle control data may be changed based on the determined vehicle performance variation. In the instant case, in the vehicle provided with the new control data, the vehicle control data of the respective control devices may be updated based on the corresponding control data.

More, the vehicle control data providing unit 170 may determine the vehicle performance variation such that if the vehicle is changed by 10% as illustrated in FIG. 8 in accordance with the change of a half of a trunk or a vehicle body part as illustrated in FIG. 4 and FIG. 5, the vehicle fuel economy is improved by 4%, the chassis durability is improved by 17%, the braking distance is reduced by 5%, the acceleration performance is improved by 8%, and the steering performance is improved by 6%. In addition, the vehicle control data providing unit 170 may update the vehicle control data of the respective control devices of the vehicle by providing new control data to the plurality of control devices of which the vehicle control data may be changed as illustrated in FIG. 9 based on the determined performance variation.

The used article price calculation unit 180 may determine the used article price of the change target part. The used article price calculation unit 180 may determine the used article price of the change target part based on information on the degree of corrosion of the change target part, a usage period, and an accident history. As described above, the used article price of the change target part determined by the used article price calculation unit 180 may be used for the payment unit 140 to compute the overall cost for the vehicle part change service.

The after-sales service prediction unit 190 may provide a prediction time required for after-sales service with respect to the changed corresponding part. According to embodiments, if the time required for the after-sales service arrives, the after-sales service prediction unit 190 may transmit a message or a notification to the user terminal 200.

Based on the above-described configuration, the system for providing a vehicle part change service according to an exemplary embodiment of the present invention may operate as shown in FIG. 9. Because the detailed technical contents at respective operations of FIG. 9 have been described, the detailed explanation thereof will be omitted.

FIG. 12 is a diagram illustrating a flow of a method for providing a vehicle part change service using a system for providing a vehicle part change service according to an exemplary embodiment of the present invention. With reference to FIG. 12, a method for providing a vehicle part change service according to an exemplary embodiment of the present invention may include receiving, by a server, a part change request for a specific vehicle kind from a user terminal; providing, by the server, the kinds of the changeable parts to the user terminal; guiding, by the server, the cost for the change target part through the user terminal if the corresponding part is selected through the user terminal and processing to transport the changed part to a service center; and outputting, by the server, at least one of vehicle specification information or vehicle control data being changed due to the change of the part.

The method for providing the vehicle part change service according to an exemplary embodiment of the present invention may further include at least one of recommending the service center that provides the vehicle part change service based on user information input from the user terminal; selecting, by the user terminal, the vehicle part change service; determining a residual value of a vehicle; and determining a used article price of the change target part.

The method may further include recalculating the residual value of the vehicle that is changed in accordance with a change of a vehicle body part after the calculating the residual value of the vehicle; transferring recalculated residual value information related to the vehicle to an insurance company server; and recalculating, by the insurance company server, a premium of the vehicle based on the recalculated residual value information related to the vehicle and transferring the recalculated premium to the user terminal.

The method may further include providing a prediction time required for an after-sales service with respect to the changed part.

The outputting, by the server, the vehicle control data being changed due to the change of the part may determine a fuel economy, a chassis durability, a braking distance, an acceleration performance, and a steering performance variation in the vehicle being changed in accordance with the change of the part, and may provide new control data to a plurality of control devices of which the vehicle control data may be changed based on the determined vehicle performance variation.

Furthermore, the guiding, by the server, the cost for the change target part through the user terminal if the corresponding part is selected through the user terminal may compute an amount of money required for the vehicle part change service based on a price of a new part, a used article price of the change target part, and a part transport distance to the service center, and may guide the determined amount of money through the user terminal.

Furthermore, the outputting, by the server, the vehicle specification information being changed due to the change of the part may provide the user terminal with one or more of vehicle weight, power, color, storage space, trunk kind, and wheel weight distribution change information in the vehicle being changed in accordance with the change of the part.

Because the detailed technical features at respective operations of the method for providing the vehicle part change service according to an exemplary embodiment of the present invention are equal to the technical features of respective configurations of the system for providing the vehicle part change service according to an exemplary embodiment of the present invention as described above, the detailed explanation thereof will be omitted.

Furthermore, the term "controller" refers to a hardware device including a memory and a processor configured to execute one or more steps interpreted as an algorithm structure. The memory may be a non-transitory storage medium including program instructions which store algorithm steps, and the processor executes the algorithm steps to perform one or more processes of a method in accordance with various exemplary embodiments of the present invention. The controller according to exemplary embodiments of the present invention may be implemented through a non-volatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of providing a vehicle part change service for replacing a vehicle part that causes to change weight of a vehicle over a predetermined value when mounted in a vehicle, the method comprising:
   receiving, by a server, a part change request for a predetermined vehicle kind from a user terminal;
   providing, by the server, kinds of changeable parts to the user terminal;
   guiding, by the server, a cost for a corresponding part to a target part mounted in the vehicle, among the changeable parts, through the user terminal in a response that the corresponding part to the vehicle part is selected through the user terminal, and processing to transport the corresponding part to a service center;
   outputting and providing, by the server, vehicle specification information being changed in accordance with replacement of the target part with the corresponding part, to the user terminal or a display unit of the vehicles;
   determining, by the server, a vehicle performance variation information updated due to the changed vehicle specification information caused in accordance with the replacement of the target part with the corresponding part and providing the user terminal or the display unit of the vehicle with the updated vehicle performance variation including wheel weight distribution change information, applied to at least a wheel of the vehicle, weight and power in the vehicle being changed in accordance with the replacement of the target part in the vehicle with the corresponding part of the vehicle; and
   providing, by the server, vehicle control data updated based on the updated vehicle performance variation information, to a plurality of control devices mounted in the vehicle,
   wherein the server further provides the updated vehicle control data determined according to the wheel distribution change information, to one of the control devices which is configured to detect replacement of at least one of front and rear wheels of the at least a wheel and is configured to control a steering angle of the vehicle according to the vehicle control data,
   wherein the changeable parts include a trunk part, a roof part and a vehicle body half part, and
   wherein the steering angle is controlled based on weight distributions of the front wheel and the rear wheel changed by part change of the changeable parts.

2. The method according to claim 1, further including at least one of:
   recommending, by the server, the service center that provides the vehicle part change service according to user information input from the user terminal;
   selecting, by the user terminal, the vehicle part change service;

determining, by the server, a residual value of the vehicle, which is changed in accordance with the change of the vehicle part; and determining, by the server, a used article price of the target part.

3. The method according to claim 1, wherein the outputting, by the server, the vehicle control data being changed due to the change of the target part in the vehicle to the corresponding part determines a fuel economy, a chassis durability, a braking distance, an acceleration performance, and a steering performance variation in the vehicle being changed in accordance with the change of the target part in the vehicle to the corresponding part.

4. The method according to claim 2, further including:
re-determining, by the server, the residual value of the vehicle that is changed in accordance with a change of the vehicle part after the determining the residual value of the vehicle;
transferring, by the server, re-determined residual value information of the vehicle to an insurance company server; and
re-determining, by the insurance company server, a premium of the vehicle according to the re-determined residual value information related to the vehicle and transferring the re-determined premium to the user terminal.

5. The method according to claim 1, wherein the guiding, by the server, the cost for the target part through the user terminal in the response that the corresponding part is selected through the user terminal incudes computing an amount of money required for the vehicle part change service according to a price of a new part, a used article price of the target part, and a part transport distance to the service center, and guides the computed amount of money through the user terminal.

6. The method according to claim 1, wherein the outputting, by the server, the vehicle specification information being changed due to the change of the target part includes providing the user terminal with at least one of color, storage space, and trunk kind in the vehicle being changed in accordance with the replacement of the target part in the vehicle to the corresponding part.

7. The method according to claim 1, further including providing a prediction time required for an after-sales service with respect to the changed corresponding part.

8. The method according to claim 2, wherein the residual value is determined by according to at least one of vehicle trim, driving distance, model year, usable residual time period, external appearance state, accident history, and changed part value information in the vehicle.

9. The method according to claim 2, further including:
in a response that a part change order for a predetermined vehicle kind is received, selecting an ordered part in a storage storing the changeable parts, to perform painting in a response that the ordered part has not been painted, and to transport the ordered part to the service center after completion of packing of the ordered part.

* * * * *